United States Patent
Soh et al.

(10) Patent No.: US 8,420,931 B2
(45) Date of Patent: Apr. 16, 2013

(54) ELECTRICAL JUNCTION BOX

(75) Inventors: Shutoh Soh, Shizuoka (JP); Yasuhito Suzuki, Shizuoka (JP); Suguru Sakai, Shizuoka (JP); Tomoki Urasawa, Shizuoka (JP); Yoshihito Imaizumi, Shizuoka (JP); Hiroaki Takahashi, Shizuoka (JP); Ryouta Ando, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 153 days.

(21) Appl. No.: 12/926,403

(22) Filed: Nov. 16, 2010

(65) Prior Publication Data

US 2011/0139482 A1  Jun. 16, 2011

(30) Foreign Application Priority Data

Dec. 14, 2009 (JP) ................................. 2009-282744
Jun. 18, 2010 (JP) ................................. 2010-139394

(51) Int. Cl.
*H02G 3/08* (2006.01)
*H05K 5/00* (2006.01)

(52) U.S. Cl.
USPC ........... 174/50; 174/520; 174/17 R; 439/76.1; 439/76.2; 439/535

(58) Field of Classification Search .............. 174/50, 174/520, 60, 69, 17 R, 50.51; 220/3.2, 3.3, 220/4.02; 439/76.1, 76.2, 949, 535; 361/600, 361/601; 248/906, 200

See application file for complete search history.

(56) References Cited

U.S. PATENT DOCUMENTS

| | | | | |
|---|---|---|---|---|
| 6,462,270 B1* | 10/2002 | Depp et al. | ...................... | 174/50 |
| 7,253,356 B2* | 8/2007 | Kiyota et al. | .................... | 174/50 |
| 7,671,275 B2* | 3/2010 | Kubota | ........................... | 174/50 |
| 7,692,105 B2* | 4/2010 | Clark et al. | ................... | 439/76.2 |
| 2010/0326690 A1* | 12/2010 | Ejima | .............................. | 174/50 |
| 2012/0073851 A1* | 3/2012 | Takeuchi et al. | ........... | 174/50.51 |

FOREIGN PATENT DOCUMENTS

JP  2000-125450 A  4/2000

* cited by examiner

*Primary Examiner* — Angel R Estrada
(74) *Attorney, Agent, or Firm* — Edwards Wildman Palmer LLP

(57) ABSTRACT

An electrical junction box includes a junction-box body having at least an outlet for discharging a liquid inside thereof to an outside thereof; and a bracket provided between the junction-box body and a vehicle-body panel. The bracket is adapted to attach the junction-box body to the vehicle-body panel such that the bracket resides in a lower space relative to the junction-box body in a vertical direction. The bracket includes a throughhole communicating with the outlet and adapted to guide the liquid from the outlet to the outside. The bracket may include a plurality of ribs spaced from each other and upstanding in a shape of a plate toward the vehicle-body panel such that the outlet is provided between the ribs. The ribs may be connected to each other via a foot of the bracket upstanding in a shape of a plate toward the vehicle-body panel.

8 Claims, 9 Drawing Sheets

ELECTRICAL JUNCTION BOX

CROSS REFERENCE TO RELATED APPLICATIONS

This application claims priority to Japanese Patent Application No. 2009-282744 filed on Dec. 14, 2009 and Japanese Patent Application No. 2010-139394 filed on Jun. 18, 2010, the contents of which are fully incorporated herein by reference.

BACKGROUND OF THE INVENTION

1. Field of the Invention

The present invention, relates to an electrical junction box mounted in an engine room of an automobile.

2. Description of the Related Art

A moving vehicle incorporates various electronic devices, the moving vehicle being typically, but not limited to, an automobile. In order to power these electronic devices, the automobile has an electrical junction box that incorporates electrical components including a connector, a relay, and a fuse. The electrical junction is provided at a predetermined location between a power source and the electronic devices.

The electrical junction box may be referred to as a junction block, a fuse block, or a relay box. In this description, the junction block, fuse block, and relay box are hereafter generically referred to as the "electrical junction box."

FIG. 14 is a perspective view illustrating part of such a conventional electrical junction box, and FIG. 15 a perspective view of the electrical junction box illustrated in FIG. 14 viewed from an opposite side thereof. The conventional electrical junction box 101 (for example, see Japanese Patent Application Laid-Open Publication No. 2000-125450) comprises a junction-box body 102 that has an outlet 102a for discharging water that may reside inside thereof, and a bracket 105 adapted to attach the junction-box body 102 to a vehicle-body panel 200.

The junction-box body 102 takes a shape of a box defined by outer walls 103, 104, inside of which various electrical components (not shown) are accommodated.

The outlet 102a extends through the outer wall 104 of the junction-box body 102, the outer wall 104 facing the vehicle-body panel 200.

The bracket 105 resides between the junction-box body 102 and the vehicle-body panel 200. A bolt may be inserted into the bracket 105 and screwed to the vehicle-body panel 200, so that the junction-box body 102 is attached to the vehicle-body panel 200 via the bracket 105 (see FIG. 14).

As shown in FIG. 14, in the state where the junction-box body 102 is attached to the vehicle-body panel 200 via the bracket 105, a gap may exist between the outer wall 104 having the outlet 102a and the vehicle-body panel 200. This means that an opening of the outlet 102a may be exposed to an outside of the outer wall 104.

The engine room in which the conventional electrical junction box 101 is mounted may be washed under application of pressurized water (i.e., subjected to high-pressure washing). Understandably, as the automobile is high-pressure-washed, water used in the high-pressure washing may enter an inside of the junction-box body 102 of the electrical junction box 101 via the opening of the outlet 102a.

SUMMARY OF THE INVENTION

In view of the above drawback found in the conventional electrical junction box, an object of the present invention is to provide an electrical junction box that is capable of preventing entry of the water into the inside of the junction-box body via the outlet provided in the junction-box body and promptly discharging the water that entered the inside of the junction-box body, which may be due to dew condensation, to the outside of the junction-box body.

In order to provide solution to the above-identified problem, an electrical junction box according to one embodiment of the present invention comprises a junction-box body having an outlet adapted to discharge a liquid residing inside of the junction-box body; and a bracket adapted to attach the junction-box body to a vehicle-body panel. The bracket is provided between the junction-box body and the vehicle-body panel such that the bracket is provided in a lower space relative to the junction-box body in a vertical direction.

The bracket includes a throughhole that is adapted to communicate with the outlet of the junction-box body. The throughhole is configured to guide the liquid via the outlet to an outside.

Preferably, one end of the throughhole opens at a portion of the bracket where the throughhole is brought into communication with the outlet of the junction-box body, and an other end of the throughhole away from the one end opens at a connection surface of the bracket. The connection surface is adapted to be disposed in an overlapping manner on the vehicle-body panel so as to attach the bracket to the vehicle-body panel.

Preferably, the vehicle-body panel is provided slantingly with respect to the vertical direction, the connection surface extends in a slanting fashion corresponding to the slantingly-provided vehicle-body panel, and the connection surface includes a first groove communicating with the throughhole and extending from the throughhole to a lower end of the slantingly-provided connection surface.

Preferably, the slantingly-provided connection surface includes a second groove communicating with the throughhole and extending from the throughhole to a higher end of the slantingly-provided connection surface.

Preferably, the bracket includes a plurality of ribs spaced from each other and upstanding in a shape of a plate toward the vehicle-body panel, and the outlet is provided between the ribs.

Preferably, the electrical junction box further comprises a foot upstanding in a shape of a plate toward the vehicle-body panel, the foot being configured to connect the ribs to each other.

With the construction and arrangement described above, the electrical junction box according to one embodiment of the present invention has liquid-entry-prevention and liquid-discharging features advantageous effects of which includes, but not limited to, the following aspects.

Since the bracket includes the throughhole that communicates with the outlet so as to guide the liquid via the outlet to the outside, the outlet is covered by the bracket, so that the water as the liquid will not be in direct contact with the opening of the outlet, and thus it is made possible to prevent the water from entering the inside of the junction-box body via the outlet, and obtain the electrical junction box that, by virtue of the throughhole in communication with the outlet, can promptly discharge the water entering the inside of the junction-box body, which may be due to dew condensation, to the outside.

Since the one end of the throughhole opens at the location where the throughhole is brought into communication with the outlet, and the other end on the side away from the one end is provided at the location where it opens at the connection surface to be disposed in the overlapping manner on the vehicle-body panel, the water can be prevented from entering the inside of the junction-box body via the outlet, and by virtue of the throughhole in communication with the outlet, the water entering the inside of the junction-box body, which may be due to dew condensation, can be promptly discharged to the outside.

Since the vehicle-body panel may be provided slantingly with respect to the vertical direction, and the connection surface is constructed to communicate with the throughhole, and there is provided the first groove that extends from the throughhole to the lower portion of the end of the connection surface, the water entering the inside of the junction-box body can be more promptly discharged via the outlet and the throughhole, and from the first groove to the outside.

Since the connection surface communicates with the throughhole and the second groove may preferably be provided to force the water droplet attached to the inside of the outlet and the throughhole to get out of the throughhole with the air inside of the junction-box body passed through the outlet, the throughhole, and the second groove in this order.

Since the space between the ribs preferably serves as the throughhole, the throughhole may be constituted by the plurality of ribs spaced from each other without the need of individually providing the throughhole as such, which makes it possible to reduce the manufacturing costs in manufacturing process of the bracket (and accordingly the electrical junction box), and further it is made possible to make the bracket more light-weighted. Also, by virtue of the ribs, the water can be effectively prevented from entering the inside of the junction-box body via the outlet.

Since there is preferably provided the foot that upstands in a plate-like manner toward the vehicle-body panel and configured to connect the ribs to each other, the strength of the foot, and accordingly the strength of the bracket can be ensured. Also, by virtue of the foot, it is possible to further effectively prevent the water from entering the inside of the junction-box body via the outlet.

BRIEF DESCRIPTION OF THE DRAWINGS

Although the novel and inventive features believed characteristic of the present invention are set forth in the appended claims, the invention itself, however, a preferred mode of application or usage thereof, and further objectives and advantages thereof will best be understood upon reading of the following detailed description of illustrative embodiments with reference made to the accompanying drawings, wherein:

DESCRIPTION OF THE EXEMPLARY EMBODIMENTS

An electrical junction box according to a first exemplary embodiment of the present invention is described below in detail with reference to FIGS. 1 to 9. In this description, a junction block, a fuse block, and a relay box may be generically referred to as the electrical junction box 1.

The electrical junction box 1 is adapted to be mounted in an engine room of an automobile to power various electronic components incorporated in the automobile.

Figure 1:
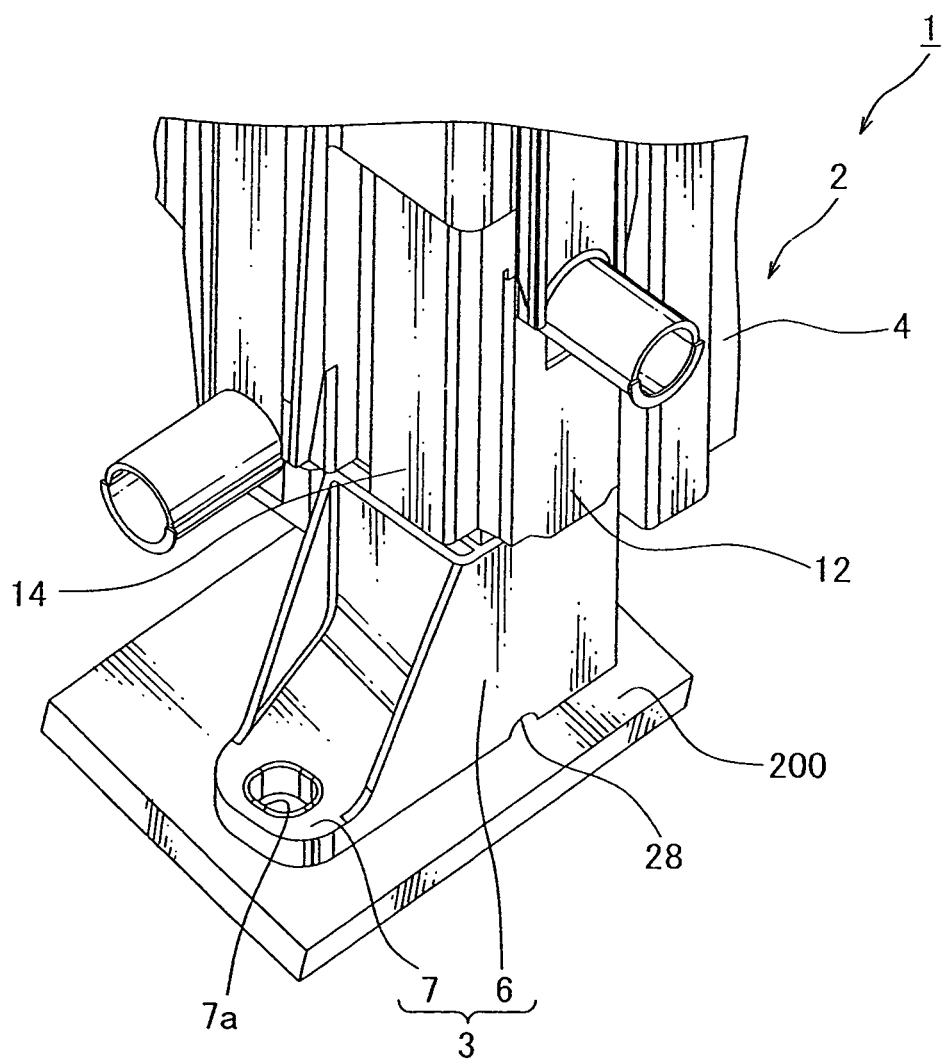
FIG. 1 is a perspective view of a partly illustrated electrical junction box according to a first embodiment of the present invention.

Referring first to FIG. 1, the electrical junction box 1 takes a shape of a box and comprises (a) a junction-box body 2 configured to accommodate various electrical components (not shown) therein and (b) a bracket 3 adapted to attach the junction-box body 2 to a vehicle-body panel 200 constituting (part of) a body of the automobile.

Figure 2:
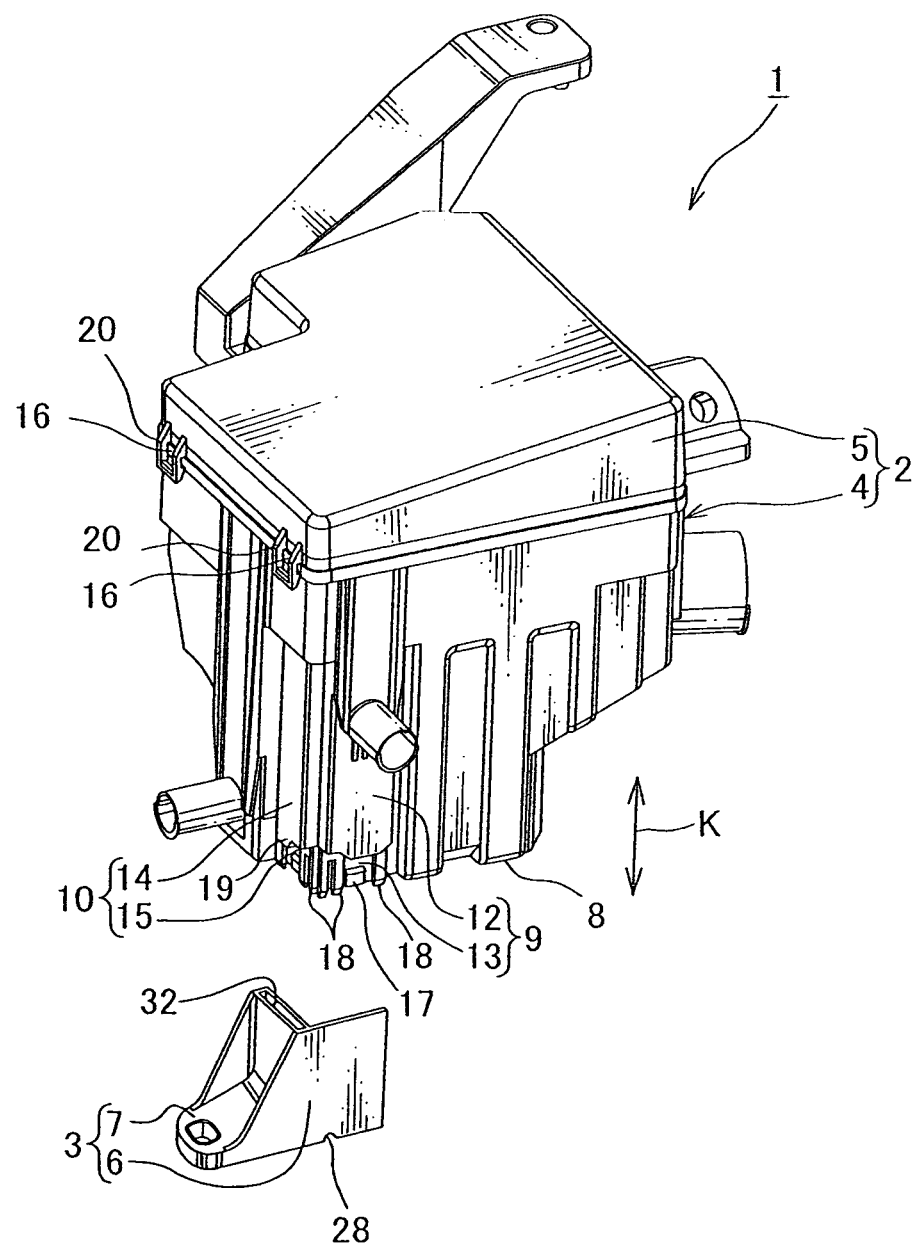
FIG. 2 is a perspective view illustrating assembling operation of the electrical junction box illustrated in FIG. 1, in which a bracket is being mounted to a junction-box body of the same electrical junction box.
Figure 3:
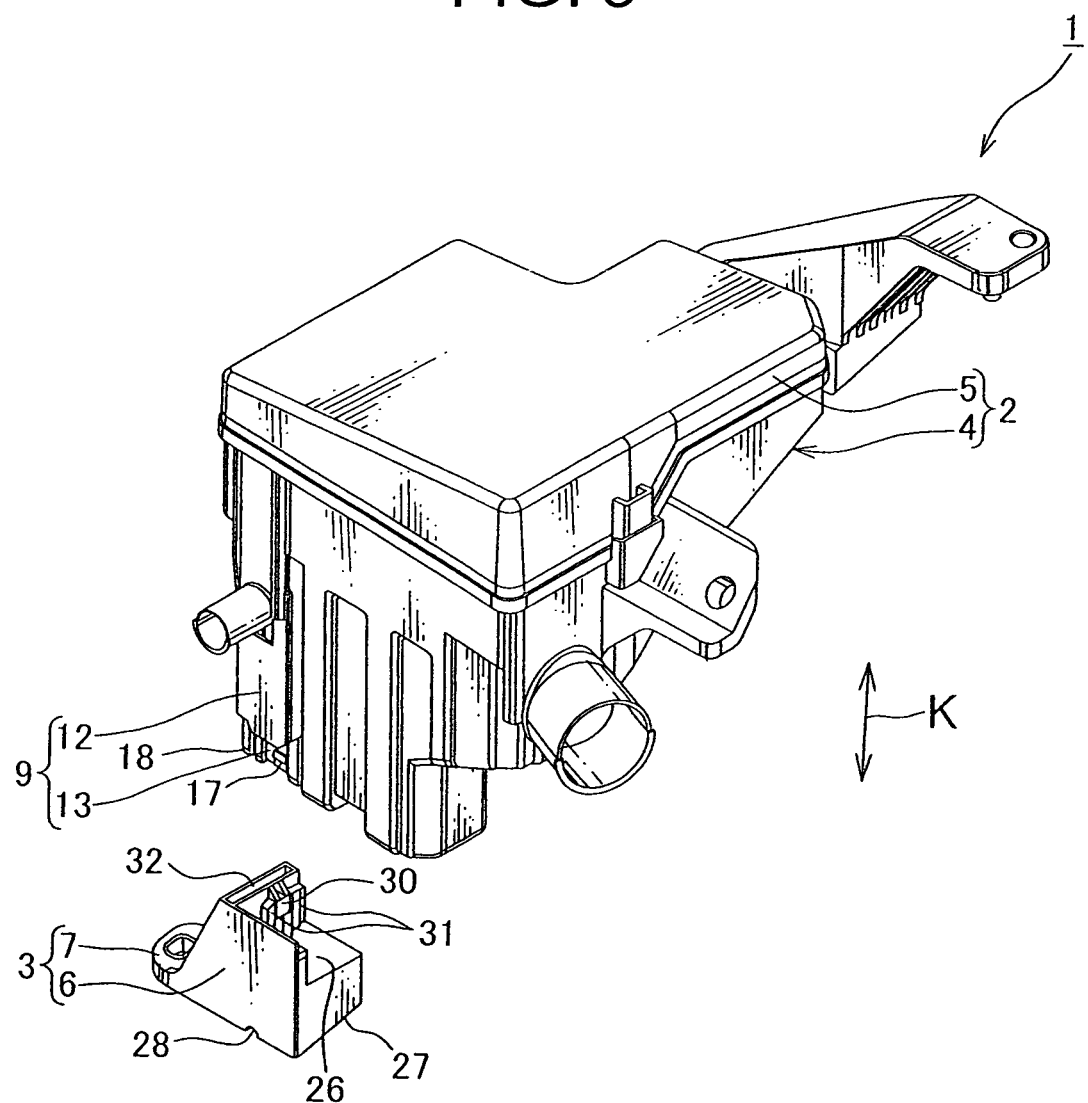
FIG. 3 is a perspective view of the electrical junction box illustrated in FIG. 2 viewed from an opposite side thereof.

The junction-box body 2 includes a body portion 4 defined by a plurality of walls 8, 9, 10 to have a shape of a bottomed cylinder, and an upper cover 5 detachably attached to a top surface of the body portion 4, the upper cover 5 residing in an upper half region in FIGS. 2 and 3. The upper cover 5 is also made in a shape of a bottomed cylinder.

An arrow K illustrated in FIGS. 2 and 3 represents a direction orthogonal to the top surface of the body portion 4. When the upper cover 5 is to be attached to the body portion 4, the upper cover 5 and the body portion 4 will be moved close to each other along the arrow K. Also, when the bracket 3 is to be mounted to the body portion 4, the body portion 4 and the bracket 3 will be moved close to each other along the arrow K.

In this context, the arrow K is a direction in which the upper cover 5 and the bracket 3 are moved close to the body portion 4. Also, the arrow K is a direction parallel to a "vertical direction" as used in the appended claims. The electrical junction box 1 is arranged and oriented such that the arrow K becomes parallel to the vertical direction.

The body portion 4 is made of synthetic resin and formed by known injection molding. The body portion 4 has a bottomed-cylindrical shape defined by the bottom wall 8 opposite the top surface and the sidewalls 9, 10 each continuing to the bottom wall 8. In addition to these walls 8, 9, 10, the body portion 4 includes a plurality of locking projections 16 configured to be brought into locking with a locking arm 20 of the upper cover 5, which will be described later; a plurality of protrusions 17 configured to be brought into locking with a locking lance 30 of the bracket 3, which also will be described later; and a pair of first guide portions 18 configured to be brought into engagement with a second guide portion 31 of the bracket 3.

The bracket 3 is attached to a corner of the body portion 4, the corner being near the bottom wall 8.

The corner of the body portion 4 to which the bracket 3 is attached is depressed inward with reference to the body portion 4, the depressed contour of the corner being defined by inner walls 13, 15 of the sidewalls 9, 10.

Figure 4:
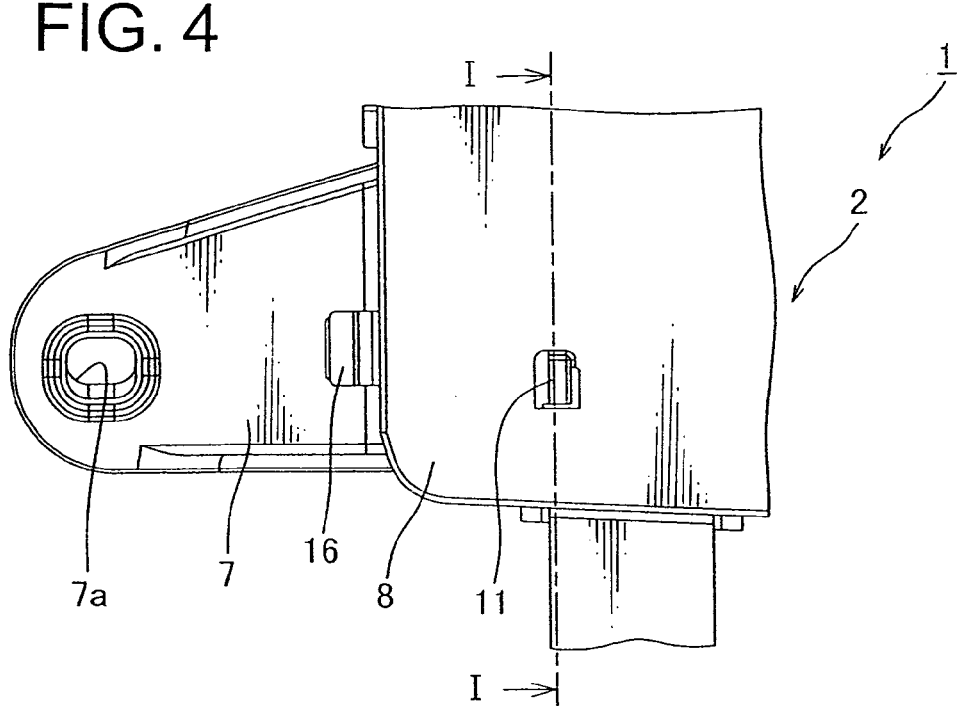
FIG. 4 is a top view illustrating a state where an upper cover of the electrical junction box illustrated in FIG. 1 is detached.
Figure 5:
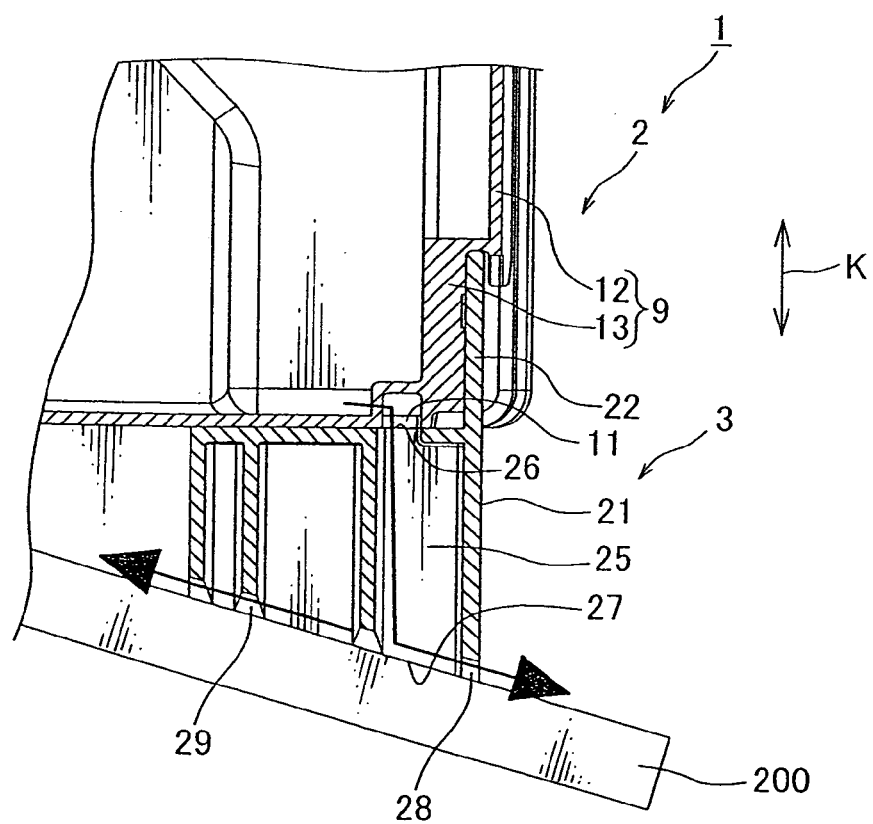
FIG. 5 is a cross-sectional view schematically illustrating a configuration of the electrical junction box illustrated in FIG. 4 taken along the line I-I in FIG. 4.
Figure 6:
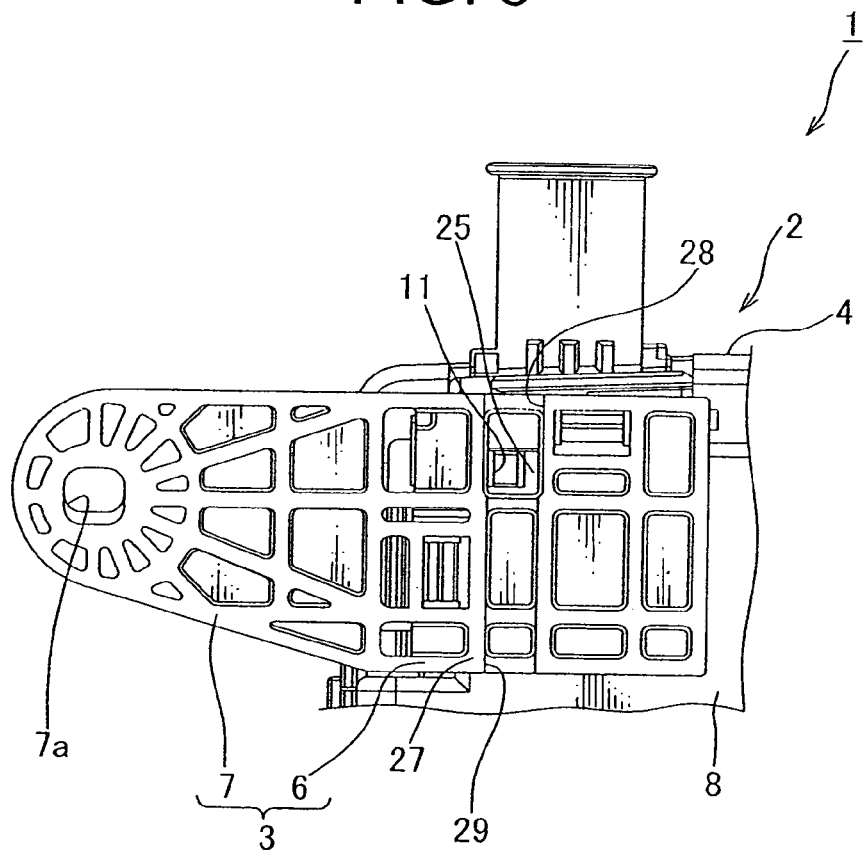
FIG. 6 is a bottom view of the electrical junction box illustrated in FIG. 4.

The bottom wall 8 includes an outlet 11 extending therethrough, which is illustrated in FIGS. 4, 5, and 6. The sidewall 9 is constituted by a body wall 12 and the inner wall 13 continuing to the body wall 12, the inner wall 13 being depressed inward of the body portion 4. Likewise, the sidewall 10 is constituted by a body wall 14 and the inner wall 15 continuing to the body wall 12, the inner wall 15 being depressed inward of the body portion 4.

Referring to FIG. 2, there is provided an entry portion 19 at a distal end away from the top surface of the body wall 14. The entry portion 19 protrudes in a direction away from the top surface along the arrow K, such that the entry portion 19 is allowed to enter an entry-accommodating portion 32 provided in a second wall portion 23 of the bracket 3 (which are to be described later in detail).

The protrusion 17 protrudes from an outer surface of the inner walls 13, 15. Also, the protrusion 17 tapers such that an amount of protrusion thereof increases gradually as it becomes away from an edge of the inner walls 13, 15 continuing to the bottom wall 8. Also, the protrusion 17 is configured to be brought into locking with the locking lance 30 provided on the bracket 3. The bracket 3 is attached to the junction-box body 2 with the protrusion 17 locked with the locking lance 30.

The first guide portion 18 is formed in an L-shape in plan view. Also, a pair of the first guide portions 18 are provided such that the protrusion 17 is provided therebetween, with one end continuous to the inner wall 13, 15, and the other end oriented in a direction away from each other. Also, the first guide portion 18 is configured to be brought into engagement with a second guide portion 31 of the bracket 3 and guide the body portion 4 and the bracket 3 so that they are moved close to each other along the arrow K with the first and second guiding portions 18, 31 brought into engagement with each other.

The upper cover 5 is made of synthetic resin and formed by known injection molding. The upper cover 5 includes a plurality of the locking arms 20. The upper cover 5 is attached to the body portion 4 with the locking arm 20 of the upper cover 5 brought into engagement with the locking projection 16 of the body portion 4.

Figure 7:
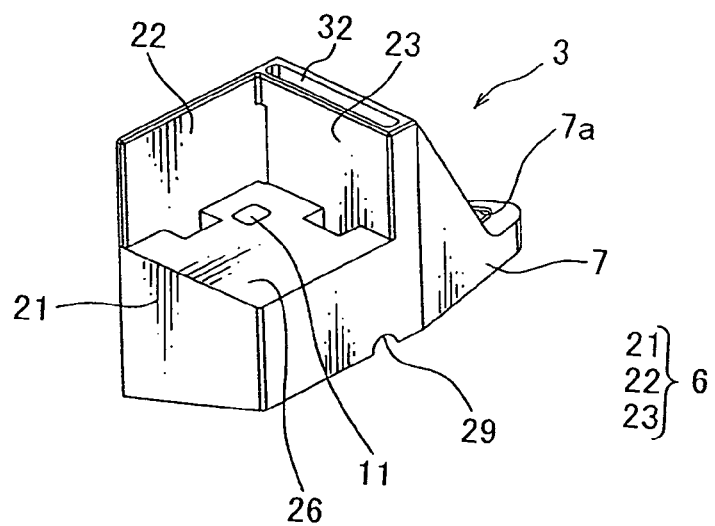
FIG. 7 is a perspective view schematically illustrating a configuration of the bracket of the electrical junction box illustrated in FIG. 1.
Figure 8:
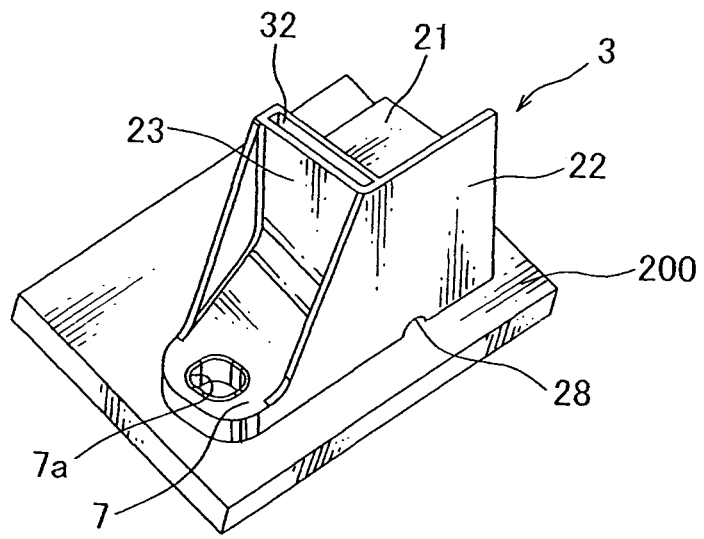
FIG. 8 is a perspective view of the electrical junction box illustrated in FIG. 7, in which the bracket is attached to a vehicle-body panel.
Figure 9:
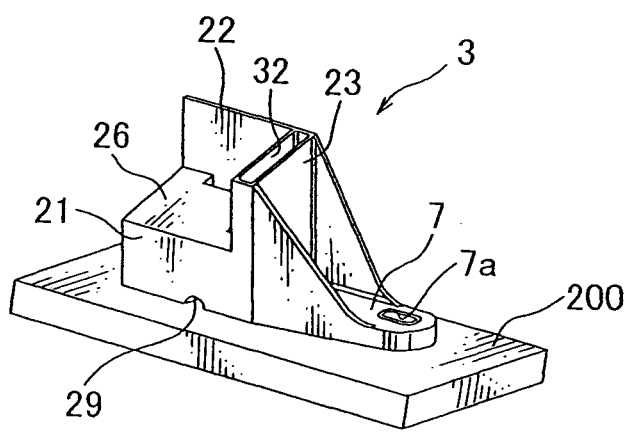
FIG. 9 is a perspective view of the bracket illustrated in FIG. 8 viewed from an opposite side thereof.

The bracket 3 is made of synthetic resin and formed by known injection molding. As shown in FIGS. 6 and 7, the bracket 3 includes: (a) a base portion 6 with a throughhole 25 provided therein that is configured to communicate with the outlet 11 in the bottom wall 8 of the body portion 4; and (b) a flange portion 7 continuing to the base portion 6 and adapted to be disposed in an overlapping manner on the vehicle-body panel 200.

The bracket 3 is arranged between the junction-box body 2 and the vehicle-body panel 200 such that the bracket 3 resides in a lower space with respect to the inside of the junction-box body 2 in the vertical direction (i.e., the direction indicated by the arrow K).

The base portion 6 has a rectangular shape and includes: (i) a platform portion 21 having an overlapping surface 26 adapted to be disposed in an overlapping manner on the bottom wall 8 of the body portion 4 and (ii) a connection surface 27 (illustrated in FIG. 5) opposed to the overlapping surface 26 and adapted to be disposed on the vehicle-body panel 200; (iii) a first wall portion 22 extending from an end of the overlapping surface 26 along the arrow K and adapted to be disposed in an overlapping manner on the inner wall 13 of the sidewall 9; (iv) a second wall portion 23 continuing to ends of the first wall portion 22 and the overlapping surface 26 and adapted to be disposed in an overlapping manner on the inner wall 15 of the sidewall 10; (v) a plurality of the locking lances 30 adapted to be brought into locking with the protrusion 17 of the inner wall 13, 15; and a pair of the second guide portions 31 adapted to be engaged with the first guide portion 18. Also, there is provided an entry-accommodating portion 32 at an end on the side away from the platform portion 21 of the second wall portion 23. The entry-accommodating portion 32 has such a concave shape that the entry portion 19 of the body wall 14 can be accommodated therein.

The throughhole 25 extends through the overlapping surface 26 and the connection surface 27 along the arrow K (extending on a straight line), and the throughhole 25 has its one end opening on the overlapping surface 26 and its other end away from the one end opening on the connection surface 27. Also, the throughhole 25 is provided such that it is brought into communication with the outlet 11 provided in the bottom wall 8 when the overlapping surface 26 of the platform portion 21 is disposed in the overlapping manner on the bottom wall 8 of the body portion 4, so that water as a liquid entering or residing in the inside of the junction-box body 2 can be guided via the outlet 11 and the throughhole 25 in communication therewith.

Referring to FIG. 5, the platform portion 21 is provided in a direction in which the connection surface 27 intersects with the overlapping surface 26. Also, in this embodiment, in view of the design of the vehicle body, the vehicle-body panel 200 is provided slantingly with respect to the vertical direction (i.e., the direction indicated by the arrow K).

Accordingly, when the connection surface 27 is disposed in an overlapping manner on the vehicle-body panel 200 and the overlapping surface 26 is disposed in an overlapping manner on the bottom wall 8 of the junction-box body 2, the junction-box body 2 is arranged in the direction in which the top surface crosses at right angles the arrow K.

As shown in FIGS. 5 and 6, the connection surface 27 includes a first groove 28 and a second groove 29. The first groove 28 and the second groove 29 are provided such that both of them rest on a single straight line. The first groove 28 is recessed from and with reference to the connection surface 27 and is constructed to communicate with the throughhole 2. The first groove 27 extends from the throughhole 25 down to a lower portion of the end of the connection surface 27.

The first groove 28 is adapted to discharge the water inside of the junction-box body that has been passed through the outlet 11 and the throughhole 25 to the outside.

The second groove 29 is recessed from and with reference to the connection surface 27 and is constructed to communicate with the throughhole 2. The second groove 29 extends from the throughhole 25 down to a higher portion of the end of the connection surface 27.

The second groove 29 is adapted to force the water droplet attached to the inside of the outlet 11 and the throughhole 25 to get out of the throughhole 25 with the air inside of the junction-box body 2 passed through the outlet 11, the throughhole 25, and the second groove 29 in this order. It should be noted that the "lower portion" of the end of the connection surface 27 indicates a portion lower in the vertical direction, i.e., the direction indicated by the arrow K (i.e., a lower side in FIG. 5) and the "higher portion" of the end of the connection surface 27 indicates a portion higher in the same vertical direction, i.e., an upper side in FIG. 5.

The locking lance 30 protrudes from an inner surface of the walls 22, 23. The locking lance 30 has one end thereof continuing to each of the inner surfaces, and the other end thereof being a free end and elastically deformable in the directions toward and away from the inner surface.

The second guide portion 31 is formed in an L-shape in plan view. A pair of the second guide portions 31 are provided such that the locking lance 30 is provided therebetween with one ends of the pair each continuing to the walls 22, 23 and the other ends thereof oriented in a direction toward each other.

The flange portion 7 is formed in a shape of a plate that extends along the vehicle-body panel 200. A hole portion 7a is provided at the center of the flange portion 7, through which a bolt is passed.

The following describes assembling operation of the electrical junction box 1. First, the electrical components are accommodated in the body portion 4.

Next, the upper cover 5 is mounted to the body portion 4 in the following manner. The upper cover 5 is moved close to the body portion 4 until the top surface of the body portion 4 is covered by the upper cover 5 with the locking arm 20 of the upper cover 5 brought into engagement with the locking portion 16 of the body portion 4.

Following this, the junction-box body 2 and the bracket 3 are moved close to each other along the arrow K in the following manner. The bracket 3 is moved close to the corner of the body portion 4 of the junction-box body 2, and the junction-box body 2 and the bracket 3 are positioned at the position where the bottom wall 8 and the overlapping surface 26 of the platform portion 21 are disposed on each other in the overlapping manner such that the inner surface of the inner walls 13, 15 and the outer surface of the walls 22, 23 are overlapped with each other.

In this state, the first guide portion 18 and the second guide portion 31 are brought into engagement with each other. After the other end of the locking lance 30 has once elastically deformed toward the walls 22, 23, the locking lance 30 is again restored to the neutral state by virtue of the resilient restoring force, and thereby, simultaneously with the protrusion 17 being locked with the locking lance 30, the entry portion 19 enters the entry-accommodating portion 32, so that the bracket 3 is mounted to the junction-box body 2. In this manner, the electrical junction box 1 is assembled.

Finally, the flange portion 7 is disposed in an overlapping manner on the vehicle-body panel 200, and the bolt passing inside of the hole portion 7a is screwed onto a nut attached to the vehicle-body panel 200, so that the electrical junction box 1 is mounted to the vehicle-body panel 200.

The electrical junction box 1 according to this embodiment comprises the junction-box body 2 having the above described construction and arrangement and the bracket 3 having the above-described construction and arrangement. Since the bracket 3 includes the throughhole 25 that communicates with the outlet 11 so as to guide the liquid via the outlet 11 to the outside, the outlet 11 is covered by the bracket 3, so that the water as the liquid will not be in direct contact with the opening of the outlet 11, and thus it is made possible to prevent the water from entering the inside of the junction-box body 2 via the outlet 11, and obtain the electrical junction box 1 that, by virtue of the throughhole 25 in communication with the outlet 11, can promptly discharge the water entering the inside of the junction-box body 2, which may be due to dew condensation, to the outside.

Also, the one end of the throughhole 25 opens at the location where the throughhole 25 is brought into communication with the outlet 11, and the other end on the side away from the one end is provided at the location where it opens at the connection surface 27 to be disposed in the overlapping manner on the vehicle-body panel 200. Accordingly, the water can be prevented from entering the inside of the junction-box body 2 via the outlet 11, and by virtue of the throughhole 25 in communication with the outlet 11, the water entering the inside of the junction-box body 2, which may be due to dew condensation, can be promptly discharged to the outside.

Also, the vehicle-body panel 200 is provided slantingly with respect to the vertical direction K, and the connection surface 27 is constructed to communicate with the throughhole 2, and there is provided the first groove 28 that extends from the throughhole 25 to the lower portion of the end of the connection surface 27. Accordingly the water entering the inside of the junction-box body 2 can be more promptly discharged via the outlet 11 and the throughhole 25, and from the first groove 28 to the outside.

Also, the connection surface 27 is configured to communicate with the throughhole 2, and the second groove 2 that extends from the throughhole 25 to the higher portion of the end of the connection surface 27 residing in a high space relative to the connection surface 27. Accordingly, the air inside of the junction-box body 2 passes through the outlet 11, the throughhole 25, and the second groove 29 in this order, so that the water droplet attached to the inside of the outlet 11 and the throughhole 25 can be forced to the outside of the throughhole 25.

Although the junction-box body 2 and the bracket 3 of this embodiment are two discrete elements that are individually-provided. However, the present invention is not limited to this construction; the junction-box body 2 and the bracket 3 may be provided in one piece therewith.

Also, in this embodiment, one end of the throughhole 25 opens at a location where the throughhole 25 is brought into communication with the outlet 11, the other end on the side away from the one end is provided at the location where it opens at the connection surface 27 to be disposed in the overlapping manner on the vehicle-body panel 200. In other words, the throughhole 25 is formed in the linear fashion along the arrow K. However, the present invention is not limited to this specific construction. The throughhole 25, as long as it is provided at the location where it is in communication with the outlet 11, does not need to be provided at the location where the one end opens at the location where the throughhole 25 is brought into communication with the outlet 11 and the other end on the side away from the one end does not need to be provided at the location where it opens at the connection surface 27 to be disposed in the overlapping manner on the vehicle-body panel 200. In other words, the throughhole 25 does not need to be formed in the linear fashion along the arrow K (it may be formed in a curved fashion).

The connection surface 27 of this embodiment includes the first groove 28 and the second groove 29. However, the present invention is not limited to this specific construction; it is also possible to only provide either one of the first groove 28 and the second groove 29. Further, the first groove 28 and the second groove 29 may be both omitted.

Second Embodiment

An electrical junction box 1' according to a second embodiment of the present invention is described below in detail with reference to FIGS. 10 to 13, in which the same reference signs are assigned to the same elements as those described in the context of the first embodiment, whose discussion will not be repeated.

Figure 10:
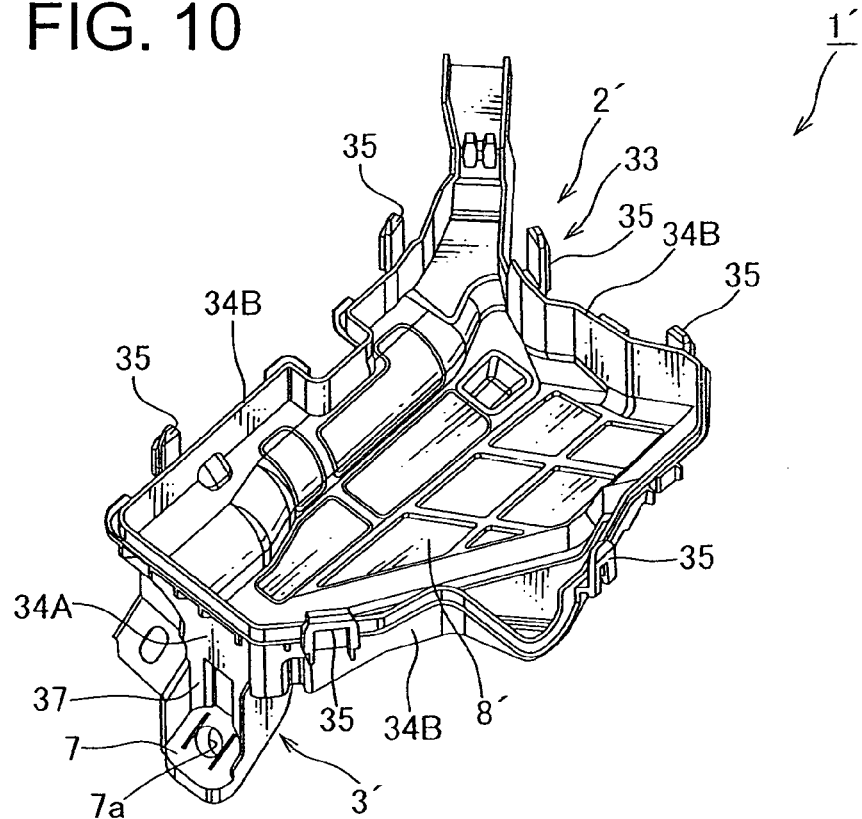
FIG. 10 is a perspective view illustrating a lower cover and a bracket of an electrical junction box according to a second embodiment of the present invention.

Referring to FIG. 10, the electrical junction box 1' includes a junction-box body 2' accommodating various electrical components (not shown) therein; and a bracket 3' configured to attach the junction-box body 2' to a vehicle-body panel 200 constituting part of an automobile's body.

The junction-box body 2' includes a body (not shown) in a shape of a box having an opening defined by a plurality of not-shown peripheral walls; and a lower cover 33 detachably attached to the body such that the opening is covered thereby. The body is made of synthetic resin and formed by known injection molding. Also, the body includes a lock-part-receiver part (not shown) adapted to be brought into locking with a lock part 35 of the lower cover 33.

The lower cover 33 is made of synthetic resin and formed by known injection molding. Also, the lower cover 33 includes a bottom wall 8'; a plurality of peripheral walls 34A, 34B upstanding from an edge of the bottom wall 8'; and a plurality of lock parts 35.

Figure 11:
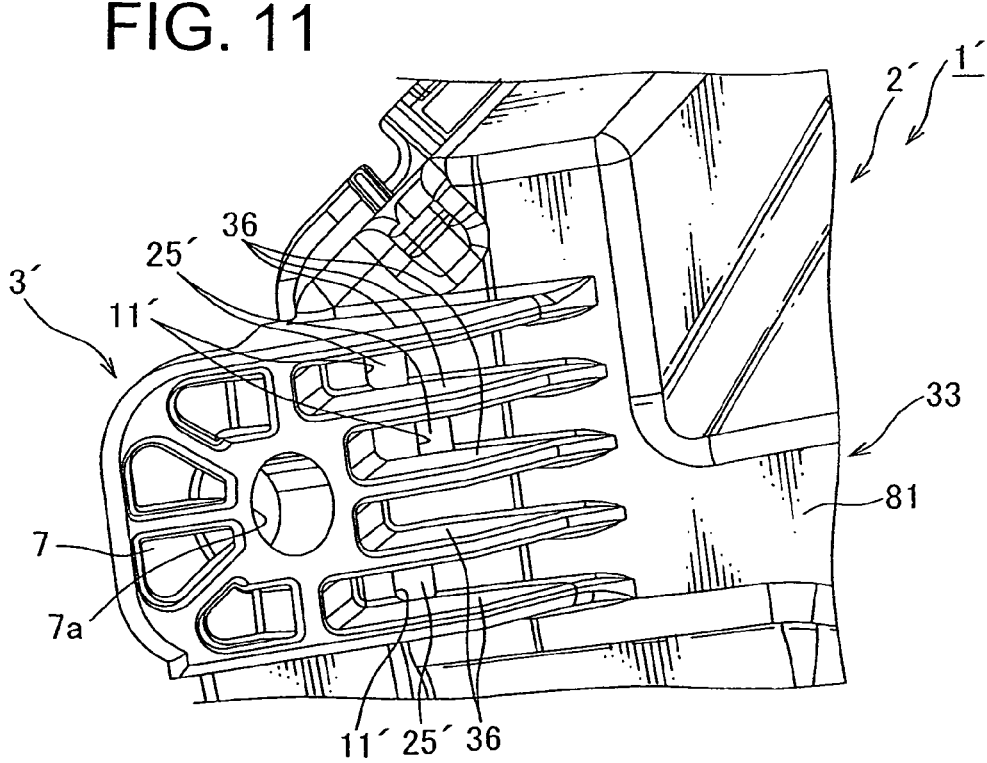
FIG. 11 is a perspective view of the electrical junction box illustrated in FIG. 10 viewed from a bottom side thereof.
Figure 12:
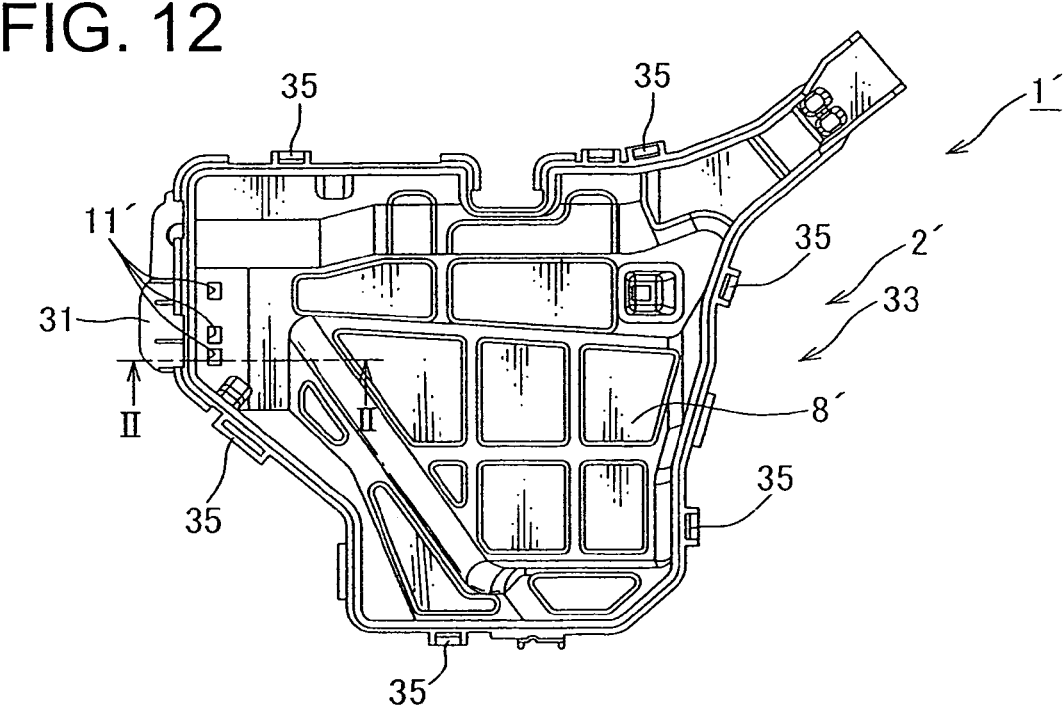
FIG. 12 is a plan view of a lower cover of the electrical junction box illustrated in FIG. 10 viewed from the bottom side.

Referring to FIGS. 11 and 12, the lower cover 33 has a shape of a bottomed cylinder defined by the bottom wall 8' and the plurality of peripheral walls 34A, 34B. Also, the bottom wall 8' includes a plurality of outlets 11' extending through the bottom wall 8'.

Figure 13:
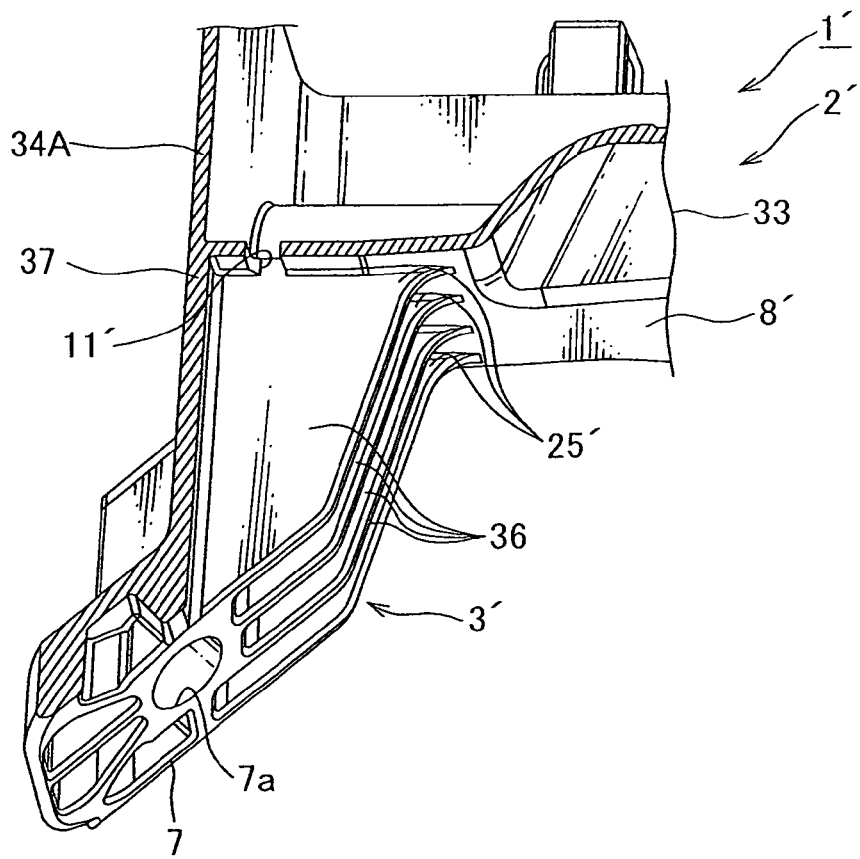
FIG. 13 is a cross-sectional view taken along the line II-II in FIG. 12.
Figure 14:
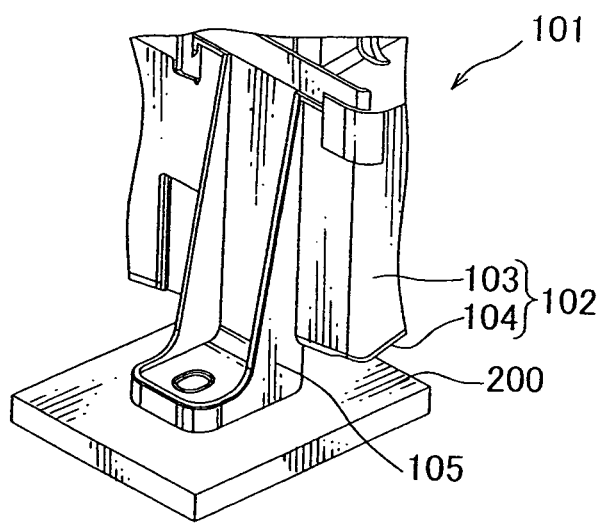
FIG. 14 is a perspective view of a partly illustrated conventional electrical junction box.
Figure 15:
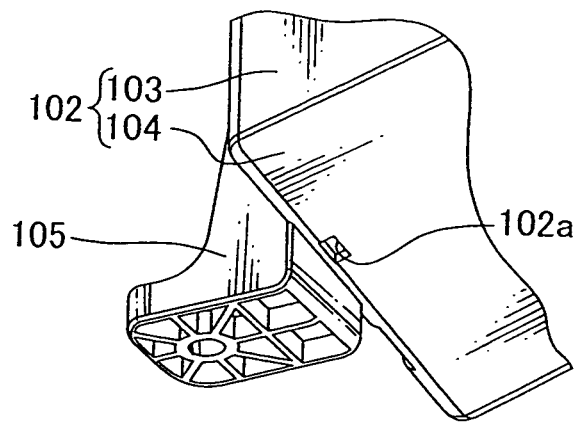
FIG. 15 is a perspective view of the electrical junction box illustrated in FIG. 14 viewed from an opposite side thereof.

Referring to FIG. 13, the bracket 3' is made of synthetic resin and formed by known injection molding. The bracket 3' includes a plurality of ribs 36 upstanding from the bottom wall 8' toward the vehicle-body panel 200 in a plate-like manner; a foot 37 upstanding from the peripheral wall 34A of the lower cover 33 toward the vehicle-body panel 200 in a plate-like manner and connecting the plurality of ribs 36; and a flange portion 7 continuing to the foot 37 and adapted to be disposed in an overlapping manner on the vehicle-body panel 200.

The bracket 3' is provided between the junction-box body 2' and the vehicle-body panel 200. The bracket 3 is positioned in a lower space relative to the junction-box body 2 in the vertical direction (i.e., the direction indicated by the arrow K). Also, in this embodiment, the bracket 3' is made in one piece with the lower cover 33 (junction-box body 2').

The ribs 36 are spaced from each other such that each outlet 11' is positioned between the ribs 36. Also, in this embodiment, a space between the ribs 36 is referred to as a throughhole 25'. The throughhole 25' is provided at a location where the throughhole 25' is in communication with the outlet 11' provided in the bottom wall 8' so as to guide the water as the liquid that entered the inside of the junction-box body 2' to the outside via the outlet 11'. Also, as shown in FIG. 13, the outlet 11' is provided at a position spaced from the foot 37.

Next, the following describes assembling operation of the electrical junction box 1'. First, the electrical components are accommodated in the inside of the body. Next, the lower cover 33 is moved close to the body such that the opening of the body is covered thereby, and the lower cover 33 is attached to the body with the lock part 35 of the lower cover 33 brought into engagement with the lock-part-receiver part of the body. In this manner, the junction-box body 2' is assembled and the electrical junction box 1' is also assembled, for the lower cover 33 includes the bracket 3' in one piece therewith.

According to the second embodiment, the bracket 3' includes the plurality of ribs 36 spaced from each other and upstanding toward the vehicle-body panel 200 in the plate-like manner, and the outlet 11' is provided between the plurality of ribs 36.

Since the space between the ribs 36 serves as the throughhole 25', the throughhole 25' is constituted by the plurality of ribs 36 spaced from each other without the need of individually providing the throughhole 25' as such, which makes it possible to reduce the manufacturing costs in manufacturing process of the bracket 3' (and accordingly the electrical junction box 1'), and further it is made possible to make the bracket 3' more light-weighted. Also, by virtue of the ribs 36, the water can be prevented from entering the inside of the junction-box body 2' via the outlet 11'.

Also, since there is provided the foot 37 upstanding in the plate-like manner toward the vehicle-body panel 200 and configured to connect the ribs 36 to each other, the strength of the foot 37, and accordingly the strength of the bracket 3' can be ensured. Also, by virtue of the foot 37, it is possible to further effectively prevent the water from entering the inside of the junction-box body 2' via the outlet 11'.

Although the junction-box body 2' and the bracket 3' of this embodiment are two discrete elements that are individually provided, the present invention is not limited to this specific construction. The junction-box body 2' and the bracket 3' may be provided in one piece therewith.

The description of the present invention has been presented by way of illustration and description, and is not intended to be exhaustive or limited to the invention in the form disclosed. Modifications and variations will be made by those of ordinary skill in the art within the scope and spirit of the present invention.

What is claimed is:

1. An electrical junction box comprising:
   (a) a junction-box body having an outlet adapted to discharge a liquid residing inside of the junction-box body; and
   (b) a bracket adapted to attach the junction-box body to a vehicle-body panel, the bracket having a throughhole adapted to communicate with the outlet of the junction-box body, the throughhole being configured to guide the liquid via the outlet to an outside, wherein the bracket is provided between the junction-box body and the vehicle-body panel such that the bracket is provided in a lower space relative to the junction-box body in a vertical direction.

2. The electrical junction box according to claim 1, wherein one end of the throughhole opens at a portion of the bracket where the throughhole is brought into communication with the outlet of the junction-box body, and an other end of the throughhole away from the one end opens at a connection surface of the bracket, the connection surface being adapted to be disposed in an overlapping manner on the vehicle-body panel so as to attach the bracket to the vehicle-body panel.

3. The electrical junction box according to claim 2, wherein the vehicle-body panel is provided slantingly with respect to the vertical direction, the connection surface extends in a slanting fashion corresponding to the slantingly-provided vehicle-body panel, and the connection surface includes a first groove communicating with the throughhole and extending from the throughhole to a lower end of the slantingly-provided connection surface.

4. The electrical junction box according to claim 3, wherein the slantingly-provided connection surface includes a second groove communicating with the throughhole and extending from the throughhole to a higher end of the slantingly-provided connection surface.

5. The electrical junction box according to claim 1, wherein the bracket includes a plurality of ribs spaced from each other and upstanding in a shape of a plate toward the vehicle-body panel, and the outlet is provided between the ribs.

6. The electrical junction box according to claim 5, wherein the electrical junction box further comprises a foot upstanding in a shape of a plate toward the vehicle-body panel, the foot being configured to connect the ribs to each other.

7. The electrical junction box according to claim 2, wherein the bracket includes a plurality of ribs spaced from each other and upstanding in a shape of a plate toward the vehicle-body panel, and the outlet is provided between the ribs.

8. The electrical junction box as set forth in claim 7, wherein the electrical junction box further comprises a foot upstanding in a shape of a plate toward the vehicle-body panel, the foot being configured to connect the ribs to each other.

* * * * *